UNITED STATES PATENT OFFICE.

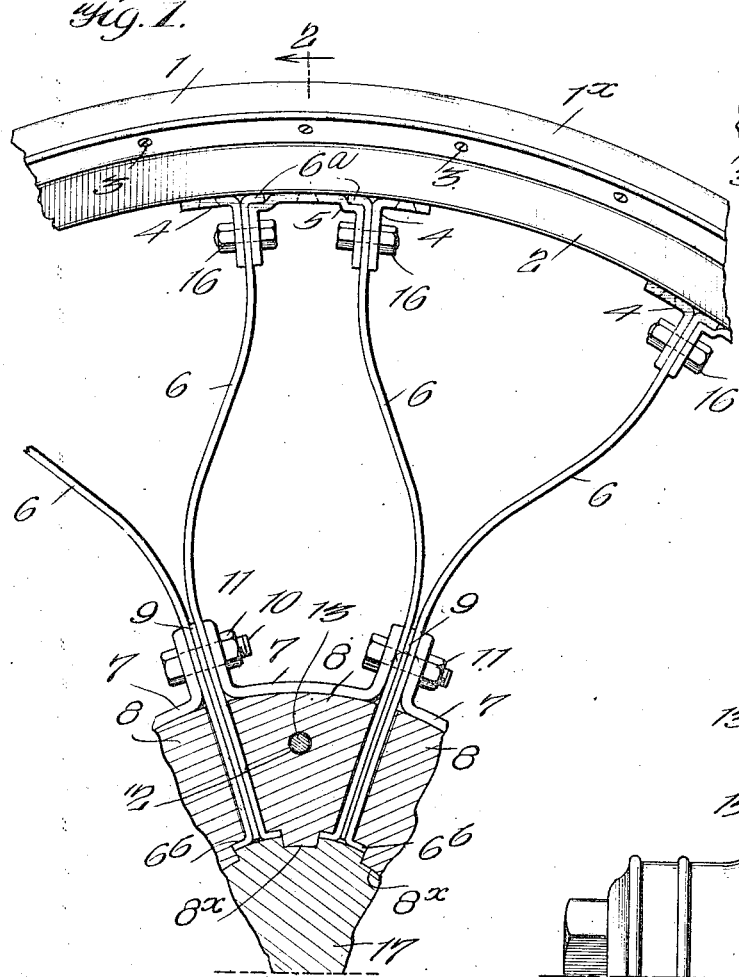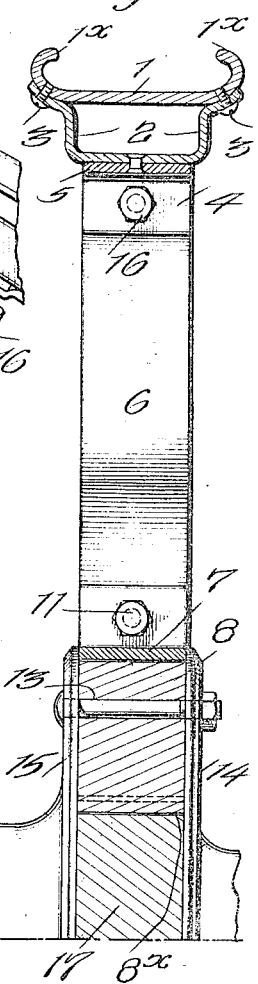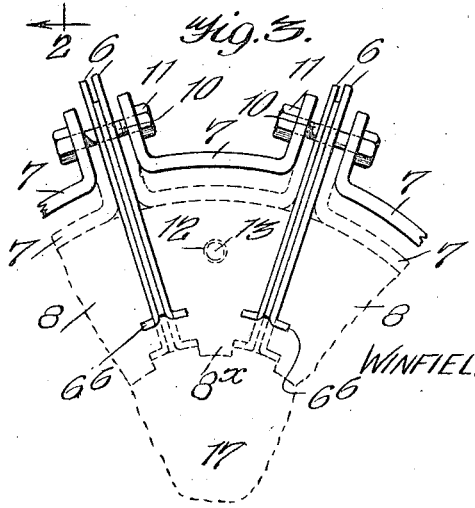

WINFIELD S. WATSON, OF BUTLER, PENNSYLVANIA.

SUSPENSION-WHEEL.

1,162,670.  Specification of Letters Patent.  Patented Nov. 30, 1915.

Application filed January 11, 1915. Serial No. 1,520.

*To all whom it may concern:*

Be it known that I, WINFIELD S. WATSON, a citizen of the United States, and a resident of Butler, in the county of Butler and State of Pennsylvania, have invented certain new and useful Improvements in Suspension-Wheels, of which the following is a specification.

My invention relates to improvements in suspension wheels, and it consists in the combination, construction, and arrangement hereinafter described and claimed.

An object of my invention is to provide a tension wheel of great strength, durability, and resiliency and which is more simple in construction than the tension wheels known as wire wheels.

A further object of my invention is to provide a tension wheel having steel rims and spokes, the latter being provided with hub connections that may be used with the metal flanges or hub housing of any ordinary wooden spoke wheel used on automobiles.

Another object of my invention is to provide a tension wheel whose spokes are made of broad "flat wire" of curved design, which extend to the base of the hub housing, forming in connection with a peculiar brace member and wood filler, the base of the wheel hub to which the flanges are attached, thus assuring lateral strength to the wheel, without the necessity of using drop forgings, castings, or other parts to connect the spokes to the wheel hub.

A further object of my invention is to provide a tension wheel which may be readily assembled, means being provided for tightening the spokes to any uniform tension during the assembling of the parts.

A further object of my invention is to provide a wheel of the character described in which the tension on the spokes is uniformly distributed throughout the wheel.

Other objects and advantages will appear in the following specification, and the novel features of the device will be particularly pointed out in the appended claims.

My invention is illustrated in the accompanying drawings forming part of this application, in which—

Figure 1 is a face view of a portion of the wheel, the hub being shown in section. Fig. 2 is a section along the line 2—2 of Fig. 1, and Fig. 3 is a detail view of a portion of the device shown in Fig. 1, showing the parts in different position.

In carrying out my invention, I make use of a rim 1, of the clencher type which is provided with curved side flanges $1^x$, and to which is secured a stiffening member 2 which is attached by means of rivets 3, or in any other suitable manner. This stiffening member 2 is annular in shape and U-shaped in cross section as will be seen from Fig. 2 and together with the outer member 1 forms a stiff hollow rim.

Riveted or otherwise secured to the member 2 are L-shaped clamping members or clips 4. These are arranged in pairs as will be seen from Fig. 1. Between the members of each pair of clips 4 is a U-shaped companion clip 5 which is also secured to the member 2 at its center. The end of the clips 4 and 5 project inwardly as will be seen from Fig. 1.

The spokes 6 are made of broad "flat wire" bent on a double curve as shown in the drawings, and the outer end of each spoke is bent laterally as shown at $6^a$ while the inner end of the spoke is also bent laterally as shown at $6^b$. The spokes 6 are arranged in pairs, the spokes of each pair being spaced apart by means of a brace member 7 which normally rests in contact with a wood filler 8 disposed between the inner ends of each pair of spokes. Near the inner end of the spokes is a flat strip 9 which is designed to space the spokes from those of the adjacent pairs on either side.

The brace members 7 as will be seen from the drawings, are substantially U-shaped and the arms of the brace members, the spokes 6, and the spacing member 9 are provided with registering openings to receive bolts 10 which are provided with tightening nuts 11.

As will be seen from the drawings, the filler 8 is provided with an opening 12 arranged to receive a bolt 13, there being one bolt for each filler, these bolts 13 serving to hold the hub flanges 14 and 15, see Fig. 2. In practice I prefer to provide the filler 8 with an extension $8^x$ for a purpose hereinafter explained.

From the foregoing description of the various parts of the device, the operation thereof may be readily understood.

This steel wheel is designed to fit any ordinary wood wheel hub housing. The spokes 6 are secured to the rim by clamping their outer ends between the clips 4 and 5 through the medium of bolts and nuts 16. The brace members 7, it will be observed, have a body portion which is formed on the arc of a circle, this circle being definitely determined.

In Fig. 3 I have shown the position of certain of the parts before tension has been put on the spokes. In this figure it will be observed that the members 7 are held together by means of bolts 10 and nuts 11, the latter, however, not having been tightened. The full line position of the members 7 shows these members being arranged on a circle, the radius of which is greater than that of the circle which the members 7 finally form when they are tightened. The normal position is shown in dotted lines in Fig. 3. It will be apparent that if the nuts 11 in Fig. 3 are tightened, it will tend to draw the members 7 from the full line position into the dotted line position, or, in other words, to decrease the diameter of the circle. This will tend to straighten out the curved spring spokes, or in other words, to put these spokes under tension. The tension to which the spoke is subjected may be accurately determined and regulated by locating the registering openings in the spokes, spacing member 9 and brace member 7, so as to provide for a given elongation of the spokes, for it is obvious that the farther away from the center these registering openings are spaced, the greater will be the elongation of the spokes and the inward movement of the brace member 7, thereby putting a greater tension on the spokes.

After the spokes are secured in the manner described, the wooden fillers 8 are placed in between the ends of adjacent spokes and the brace member 7. I prefer to drive the fillers in tightly. It will be noted that the spokes together with the brace member form a retaining frame for these fillers without the addition of any other retaining member. Since the ends of the spokes are turned inwardly this frame virtually has four sides so that the fillers are held absolutely rigid.

A wheel thus constructed will fit the ordinary wooden wheel hub housing. In Fig. 2 it will be seen that the bolts 13 pass through the inner and outer flanges 14 and 15 respectively of the hub housing, and through the filler members 8. As stated above, an extension 8ˣ is generally left on the wooden filler members which can be cut down by the person who is fitting the wheel to the hub so as to fit the hub housing 17. In order to further facilitate the assembling of this steel wheel with the ordinary hub housing, I make the spokes 6 and the fillers 8 of the same width as the inner ends of the ordinary wooden spokes. The bolt holes 12 in the fillers also correspond to the bolt holes in the wooden spokes, so that the hub housing may be assembled with my steel wheel construction as well as with the wooden spoke construction and the same hub housing may be used for both.

I desire to call attention to the fact that this wheel should not be confused with the so-called "spring wheel." In the latter type of wheel the constant flexure of metal causes crystallization, and in a short time the wheel will break. A wheel constructed according to my invention has all the strength and durability and, in fact, more strength and durability than the ordinary wooden wheel and it also has the full advantages of a wire wheel. It is a suspension wheel in the truest sense of the word, in that the spokes are placed under tension. At the same time, owing to the curved form of the spokes they will give slightly to take up shocks and jars, but these shocks and jars will be transmitted to all parts of the wheel, so that the force is evenly distributed and each spoke aids in serving to take up the shock. There is, therefore, never any danger of exceeding the elastic limit of the spokes, as is often the case with the ordinary type of spring wheel.

The fact that the spokes project inwardly beyond the brace members 7 so as to inclose the fillers 8 renders the wheel stronger at this point than if the spring spokes merely extended to the brace member. At the same time, the spokes act as a frame as has already been explained, for holding the filler, in connection with the member 7.

The means for tightening the spokes I consider an important part of my invention. It will be readily seen that all that is necessary to give tension of the desired amount is to place the registering holes, as explained before, at such a distance that when the parts are tightened the desired tension will be had. Furthermore, the tightening of the parts results in a distribution of the tension uniformly throughout the spoke members. Thus, by the mere assembling of the parts, the adjustment is accomplished without any effort or even intention on the part of the operator or one who assembles the wheel.

I claim:

1. In a suspension wheel, a rim, a plurality of metal spokes secured thereto, a hub portion, and means carried by said hub portion for exerting tension on said metal spokes, said last-named means comprising a series of brace members disposed at equal distances from the center of the wheel, and common means for securing said spokes to said brace members and for moving the latter toward the center of the wheel, thereby exerting tension on the spokes.

2. In a suspension wheel, a rim, a plurality of spring metal spokes secured thereto, a plurality of brace members disposed at equal distances from the center of the wheel, the body portions of said brace members being formed on an arc concentric with the center of the wheel, said brace members having outwardly bent ends and being arranged to enter between the adjacent spokes, and means for securing said brace members to said spokes and for simultaneously exerting tension on the spokes.

3. In a suspension wheel, a rim, a plurality of curved spring metal spokes secured thereto and having laterally bent portions at their inner ends, a plurality of braces disposed between said adjacent spokes at equal distances from the center of the wheel and intermediate of the ends of said spring spokes, the body portions of said braces being formed on an arc concentric with the center of the wheel, and wooden fillers disposed between the ends of the spokes and the brace members.

4. In a suspension wheel, a rim, a plurality of curved spring metal spokes secured thereto and having laterally bent portions at their inner ends, a plurality of braces disposed between certain adjacent spokes at equal distances from the center of the wheel, the body portions of said braces being formed on an arc concentric with the center of the wheel, said spokes and braces having registering openings, and bolts arranged to pass through said openings for drawing the ends of said braces together, thereby exerting tension on the spokes.

5. In a suspension wheel, a rim, a plurality of curved spring metal spokes secured thereto and having laterally bent portions at their inner ends, a plurality of curved braces disposed between certain adjacent spokes at equal distances from the center of the wheel, said spokes and braces having registering openings, bolts arranged to pass through said openings for drawing the ends of the braces together, thereby exerting tension on the spokes, and a wood filler disposed adjacent to each of said brace members on the inner side thereof, said wood fillers being adjacent to certain of the spring spokes and being held by the latter in conjunction with the brace members.

6. In a suspension wheel, a rim, a plurality of spring metal spokes secured thereto at their outer ends, the inner ends of the spring spokes being bent laterally, said spokes being arranged in pairs, the members of each pair being curved toward each other at the inner ends of the spokes, a series of braces disposed between the spokes of adjacent pairs, the body portions of said braces being curved on an arc having as its center the center of the wheel, said braces being provided with outwardly bent ends, and bolts arranged to pass through the outwardly bent ends of adjacent braces and through the spokes of each pair for securing the braces to the spokes and for exerting tension on the spokes.

7. In a suspension wheel, a rim, a plurality of spring metal spokes secured thereto at their outer ends, the inner ends of the spring spokes being bent laterally, said spokes being arranged in pairs, the members of each pair being curved toward each other at the inner ends of the spokes, a series of braces disposed between the spokes of adjacent pairs, the body portions of said braces being curved on an arc having as its center the center of the wheel, said braces being provided with outwardly bent ends, and bolts arranged to pass through the outwardly bent ends of adjacent braces and through the spokes of each pair for securing the braces to the spokes and for exerting tension on the spokes, a hub, and a filler disposed between the ends of the spokes of adjacent pairs, the outside edge of each of said fillers being held by frictional engagement of said braces and the inside edge being held by frictional engagement with the bent ends of the springs.

WINFIELD S. WATSON.

Witnesses:
H. E. WATSON,
JOHN S. JACK.

Copies of this patent may be obtained for five cents each, by addressing the "Commissioner of Patents, Washington, D. C."